(12) United States Patent
Oki

(10) Patent No.: US 12,450,863 B2
(45) Date of Patent: Oct. 21, 2025

(54) INFORMATION PROCESSING DEVICE AND INFORMATION PROCESSING METHOD FOR OBJECT DETECTION AND THREE-DIMENSIONAL MAPPING

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Yutaka Oki, Ome Tokyo (JP)

(73) Assignees: Kabushiki Kaisha Toshiba; Toshiba Electronic Devices & Storage Corporation

( * ) Notice: Subject to any disclaimer, the term of this patent is extended or adjusted under 35 U.S.C. 154(b) by 615 days.

(21) Appl. No.: 17/463,416

(22) Filed: Aug. 31, 2021

(65) Prior Publication Data
US 2022/0300744 A1    Sep. 22, 2022

(30) Foreign Application Priority Data
Mar. 22, 2021  (JP) .................. 2021-047828

(51) Int. Cl.
*G06F 18/213*   (2023.01)
*G06N 20/00*   (2019.01)
(Continued)

(52) U.S. Cl.
CPC ............... *G06V 10/44* (2022.01); *G06T 7/70* (2017.01); *G06T 7/80* (2017.01); *G06V 20/56* (2022.01);
(Continued)

(58) Field of Classification Search
CPC .......... G06V 10/44; G06V 20/56; G06T 7/70; G06T 7/80; G06T 2200/04;
(Continued)

(56) References Cited

U.S. PATENT DOCUMENTS 10,132,919 B2   11/2018   Liu et al.
10,203,412 B2    2/2019   Smith et al.
(Continued)

FOREIGN PATENT DOCUMENTS

JP    H04188284 A    7/1992
JP    2009180661 A   8/2009
(Continued)

*Primary Examiner* — Siamak Harandi
*Assistant Examiner* — Mehrazul Islam
(74) *Attorney, Agent, or Firm* — Kim & Stewart LLP

(57) ABSTRACT

According to one embodiment, an information processing device includes a pixel extraction unit, a self-location estimation unit, and a three-dimensional location estimation unit. The pixel extraction unit acquires information from a plurality of pixels in an image, the plurality of pixels having a shift of a first number of pixels in a first direction, and having a shift of a second number of pixels in a second direction crossing the first direction along with a shift of at least one pixel in the first direction. The self-location estimation unit estimates a location and orientation of the sensor providing the image. The three-dimensional location estimation unit reconstructs three-dimensional information based on the information from the plurality of pixels extracted by the pixel extraction unit and the estimated location and orientation of the sensor.

20 Claims, 4 Drawing Sheets

(51) Int. Cl.
*G06T 7/70* (2017.01)
*G06T 7/80* (2017.01)
*G06V 10/44* (2022.01)
*G06V 20/56* (2022.01)

(52) U.S. Cl.
CPC ............... *G06T 2200/04* (2013.01); *G06T 2207/30244* (2013.01); *G06T 2207/30252* (2013.01)

(58) Field of Classification Search
CPC . G06T 2207/30244; G06T 2207/30252; G06T 2207/10016; G06T 7/246; G06T 7/73
See application file for complete search history.

(56) References Cited

U.S. PATENT DOCUMENTS

| | | | |
|---|---|---|---|
| 2004/0032990 A1* | 2/2004 | Okada | G06T 5/94 |
| | | | 382/260 |
| 2005/0103848 A1* | 5/2005 | Zhu | G06K 7/10851 |
| | | | 235/462.08 |
| 2009/0046995 A1* | 2/2009 | Kanumuri | G06T 3/4084 |
| | | | 386/E5.04 |
| 2012/0075428 A1 | 3/2012 | Seki | |
| 2017/0344857 A1* | 11/2017 | Martin | G06F 18/24 |
| 2019/0271767 A1* | 9/2019 | Keilaf | G01S 7/4816 |
| 2021/0026369 A1 | 1/2021 | Izawa | |
| 2021/0206459 A1* | 7/2021 | Johnson | G01C 21/32 |
| 2022/0414843 A1* | 12/2022 | Takatsu | G06T 7/73 |

FOREIGN PATENT DOCUMENTS

| | | |
|---|---|---|
| JP | 5057134 B2 | 10/2012 |
| JP | 2013214258 A | 10/2013 |
| JP | 5481337 B2 | 4/2014 |
| JP | 2016540230 A | 12/2016 |
| JP | 6410178 B2 | 10/2018 |
| JP | 2019107083 A | 7/2019 |
| JP | 2020135679 A | 8/2020 |

\* cited by examiner

SECOND DIRECTION
FIRST DIRECTION

SECOND DIRECTION
FIRST DIRECTION

INFORMATION PROCESSING DEVICE AND INFORMATION PROCESSING METHOD FOR OBJECT DETECTION AND THREE-DIMENSIONAL MAPPING

CROSS-REFERENCE TO RELATED APPLICATION

This application is based upon and claims the benefit of priority from Japanese Patent Application No. 2021-047828, filed Mar. 22, 2021, the entire contents of which are incorporated herein by reference.

FIELD

Embodiments described herein relate generally to information processing devices and information processing methods for three-dimensional mapping, object detection, and the like.

BACKGROUND

In recent years, structure from motion (SfM) techniques have been widely studied in fields such as automatic driving of vehicles and automatic operation of devices. The SfM technique replicates a 3D structure of a target object from a plurality of images. This technique includes algorithms such as video-based or real-time multi-view stereo that performs high-precision and high-density 3D reconstruction using relative posture information between an imaged object and a camera.

Since these algorithms require a relatively high throughput, reconstruction processing is mainly performed only on portions with a high gradient such as an edge, as seen in techniques such as large-scale direct monocular simultaneous localization and mapping (LSD-SLAM), for example.

However, real-time processing for 3D reconstruction at points near all edges is difficult on embedded large scale integration (LSI) chips or the like having a relatively low throughput. On the other hand, reducing the number of points utilized in the reconstruction processing is highly likely to affect precision such as non-detection of an object or an object feature.

DETAILED DESCRIPTION

Embodiments provide an information processing device that arranges points for appropriately performing 3D reconstruction.

In general, according to one embodiment, an information processing device includes a pixel extraction unit, a self-location estimation unit, and a three-dimensional location estimation unit. The pixel extraction unit acquires information on a plurality of pixels in an image from a sensor, the plurality of pixels having a shift of a first number of pixels in a first direction, a shift of a second number of pixels in a second direction crossing the first direction along with a shift of at least one pixel in the first direction. The self-location estimation unit estimates the location and orientation of the sensor. The three-dimensional location estimation unit reconstructs three-dimensional information based on the information from the plurality of pixels extracted by the pixel extraction unit, and the estimated location and orientation of the sensor.

In the following, certain example embodiments will be described with reference to the drawings. The drawings are shown as non-limiting examples, and aspects of the present disclosure are not limited to the drawings and description thereof. In the present specification, though there may be terms such as "greater than or equal to" and "less than or equal to", they may be appropriately replaced with "greater than" and "less than", respectively.

First Embodiment

Figure 1:
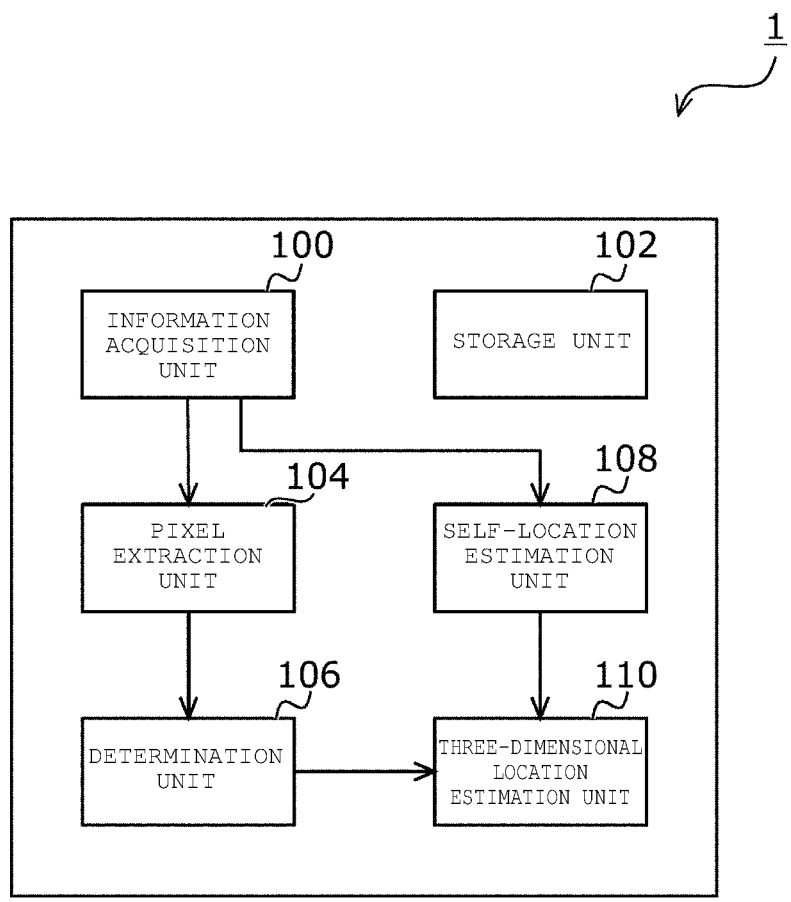
FIG. 1 is a block diagram of an information processing device according to an embodiment.

FIG. 1 is a block diagram schematically showing an information processing device according to an embodiment. The information processing device 1 includes an information acquisition unit 100, a storage unit 102, a pixel extraction unit 104, a determination unit 106, a self-location estimation unit 108, and a three-dimensional location estimation unit 110. The information processing device 1 estimates a three-dimensional location of a target (target object).

The information processing device 1 is, for example, a device mounted on a car to acquire information regarding the surrounding environment of the car and the position of the car within its environment. The information processing device 1 acquires three-dimensional information related to such things as obstacles in the surrounding environment. Further, the present disclosure is not limited to cars, but may be mounted on other vehicles such as robots, automatic guided vehicles (AGVs), airplanes, drones (unmanned aerial vehicles (UAVs)), ships, submarines, autonomous underwater vehicles (AUVs), or other moving bodies. In the following, an example mounted on a car will be described, but unless otherwise noted, similar processing may be executed by an information processing device 1 provided on any other type of vehicle or the like.

The information acquisition unit 100 acquires information about a surrounding environment through a sensor. A sensor may be, for example, a camera (image acquisition unit) to acquire images of the surroundings. In this example, images (or image information) indicating a state in the front of the vehicle on which the sensor is mounted is particularly utilized. However, the present disclosure is not limited thereto, and information regarding lateral and rear sides of the vehicle may also be acquired. In addition, the sensor may be or include a sensor that acquires information for self-location estimation, for example, sensors such as light detection and ranging (LiDAR), an inertial measurement unit (IMU), and/or a global positioning system (GPS).

In FIG. 1, the information processing device 1 is provided with an information acquisition unit 100 to be connected to a sensor or sensors, but is not limited thereto. For another example, an information acquisition unit 100 including a sensor or sensors therein may be provided outside the information processing device 1, and information from the information acquisition unit 100 may be input to the information processing device 1 through a predetermined input interface provided in the information processing device 1.

The storage unit 102 stores data required for operations of the information processing device 1. The storage unit 102 includes, for example, at least one of a temporary or non-temporary memory, a storage device, or the like. The storage unit 102 stores, for example, image information, location information, posture information, and the like, as acquired by the information acquisition unit 100. When the information processing device 1 performs an operation to specifically implement information processing by software using hardware resources, programs, executable files, and the like, required for the information processing by the software may be stored in the storage unit 102.

The pixel extraction unit 104 specifies pixels for determining a location in an image of the target in two-dimensional image information acquired by the information acquisition unit 100 to extract the information about the pixels. For example, when a horizontal direction of the image is referred to as a first direction and a vertical direction thereof is referred to as a second direction, the pixel extraction unit 104 selects a plurality of pixel groups having a shift of a first number of pixels in the first direction, and a shift of a second number of pixels in the second direction, and then extracts information from the pixels included in these selected pixel groups as information for determining a location of the target. A method of selecting pixels will be described below.

The determination unit 106 identifies whether the target exists in the selected pixels based on the pixel information extracted by the pixel extraction unit 104. The determination unit 106 detects a gradient in the pixels, for example. A technique for detecting the gradient is not particularly limited. For example, a difference in a pixel value between pixels and adjacent pixels along a moving direction of the target may be acquired, or the gradient may be acquired by executing the processing of a Sobel filter, a Laplacian filter, or another differential filter on the pixels as the target. When the gradient is greater than or equal to a predetermined value, the determination unit 106 may determine that the pixels belong to the target. The present disclosure is not limited thereto, and the determination unit 106 may determine whether the pixels belong to the target using other methods, for example, information related to other pixel values such as luminance, saturation, and color, or statistical information may be utilized.

The self-location estimation unit 108 executes a self-location estimation based on the information acquired by the information acquisition unit 100. Since the three-dimensional location estimation unit 110 estimates a three-dimensional location for the target based on information on the image information and the self-location information, the self-location estimation unit 108 estimates the self-location and orientation of the camera that acquired the image information being used as the self-location information. For an example, the self-location estimation unit 108 estimates an egomotion (translational movement and rotational movement) for the camera based on information acquired from LiDAR, IMU, GPS, or the like, along with the image information. Any algorithm may be used for the estimation algorithm.

The three-dimensional location estimation unit 110 estimates a three-dimensional location of the target with respect to the camera (a relative location of the target with respect to the camera) based on a location of the target within a two-dimensional image as detected by the determination unit 106, along with the location and posture (orientation) information for the camera estimated by the self-location estimation unit 108. Any algorithm may be used for this estimation algorithm. For example, the three-dimensional location of the target is estimated using an algorithm capable of estimating a three-dimensional location from information within a sparse region in an image determined to be the target by the determination unit 106.

The information processing device 1 outputs information for issuing an alert to a user or outputs a location of an obstacle during automatic driving based on the estimated three-dimensional location of the target. For another example, the information processing device 1 may directly output an alert or output location information and the like for the obstacle based on the three-dimensional location.

Next, a method of selecting pixels from which information is acquired by the pixel extraction unit 104 will be described.

Figure 2:
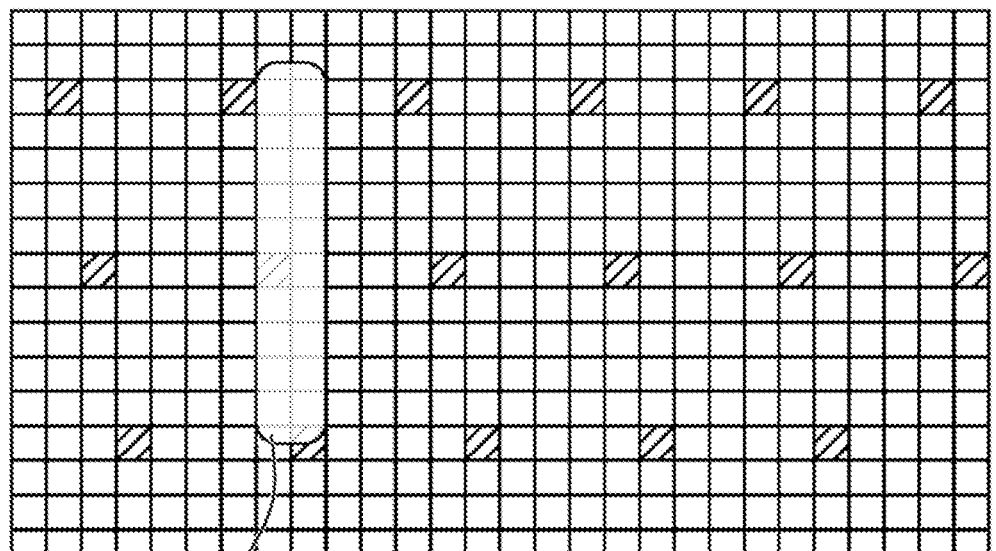
FIG. 2 is a view depicting aspects of an example of extraction of pixels according to an embodiment.

FIG. 2 is a view showing a selection state of pixels according to an embodiment. The pixel extraction unit 104 selects pixels indicated by the oblique hatching lines in the drawing as the pixels used for determining whether a target T is included in the image. By selecting pixels in this way, the probability that at least one of the selected pixels will include a portion of the target T can be increased. More specifically, as compared with a case where the selected pixels are in the same column along the second direction, the possibility that the target T will overlap the selected pixels can be about doubled.

For an example, the pixel extraction unit 104 extracts pixels at a pitch of 4 pixels (having a shift of 5 pixels) in the same row along the first direction. Similarly, in a column shifted by 1 pixel in the first direction, pixels at a pitch of 4 pixels (having a shift of 5 pixels) along the second direction are extracted. By imaging a target extending in the second direction in consecutive frames and setting pixels shifted in the first direction as the pixels to be checked in this way, the possibility that at least one pixel to be checked/evaluated will be overlapping the target is increased. By extracting pixel information in this way from the pixels to determine whether the target is present in the image, the possibility that the target will be identified and extracted from the image is increased.

The shift of the extracted pixels with respect to the first direction and the second direction may be set based on a size of the target or the like. For example, in a case of acquiring an image while driving a car, it is often particularly desired to estimate the three-dimensional location of an object having a certain size such as a pole or a human on a road as a target for an alert or the like. When the target object is, for example, a pole, the shift may be determined based on a horizontal width (the number of pixels along the first direction) and a vertical width (the number of pixels along the second direction) in an image of the pole.

For example, the first number of pixels, which is a shift in the first direction, may be twice the number of pixels of the size of the target.

In FIG. 2, since a horizontal width of the target object (target T) is 2 pixels, a pitch of 4 pixels is selected since this is twice the width of the target object. The size of the shift may be arbitrarily set according to a throughput of the processor. For example, when the throughput is low or the speed of a car is low, a pitch of 3, 4, or the like, or a pitch of a non-integer magnification may be set.

Furthermore, the size of the target object appearing in an image varies depending on a distance between the object and the camera, the orientation of the camera, internal parameters of the camera, and the like. Accordingly, if only an actual (absolute) size of the object is used, the pitch of the selected pixels may not be appropriately set for improving the accuracy of extracting/identifying the object. Therefore, how many meters away from the camera the target object is located (or expected to be located) may be arbitrarily set to determine the pitch width from a projected size in this case. Furthermore, an approximate size such as a pole on a road can be acquired, and moreover, when an object thicker than the pole is detected, the pitch width can be increased. The size of the pole or the like may be stored in the storage unit 102.

In addition, the second number of pixels, which is a shift in the second direction, may be a vertical width [in pixels] of an object divided by (the first number of pixels−1).

Figure 3:
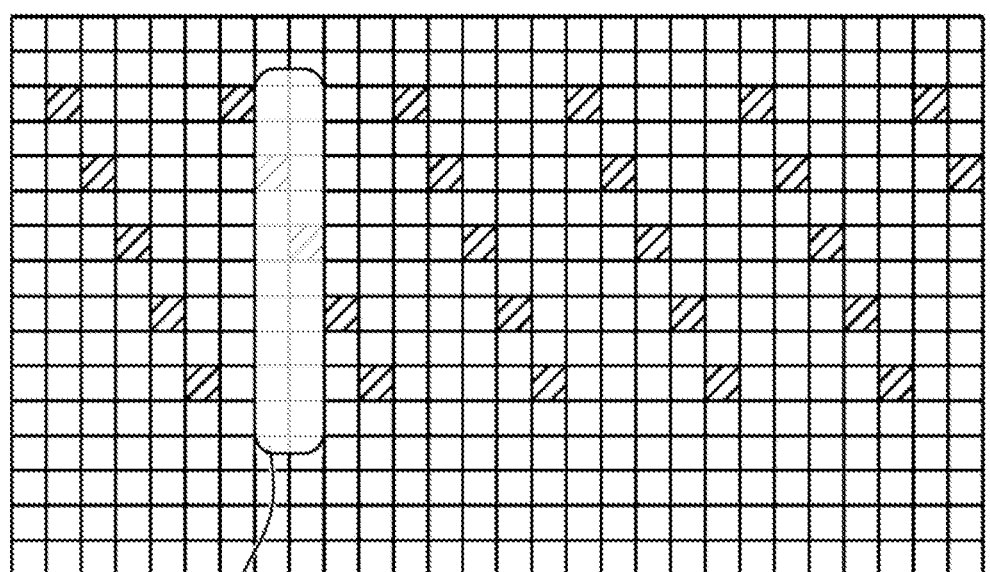
FIG. 3 is a view depicting aspects of an example of extraction of pixels according to the embodiment.

FIG. 3 is a view showing an example of setting pixels based on the above expression. The first number of pixels is 5, and the second number of pixels is 2. Further, although a set of extracted pixels is shown in FIGS. 2 and 3 along the second direction, the arrangement of the extracted pixels may be cyclically repeated in a vertical direction, for example. For example, FIG. 2 shows three selected pixels along the second direction, but there may be pixels to be checked (selected pixels) at a location separated by the second number of pixels on an upper side of the topmost selected pixels, and separated by the first number of pixels to the left side.

During driving a car, it is often desired to acquire information to identify an object such as a pole that is in parallel to a vertical direction of the screen. In such a case, assuming that the object is approximately parallel to the vertical direction (second direction) of the screen, the number of shifts in each direction can be set from the height, width, and distance of the object desired to find to the minimum.

The first number of pixels and the second number of pixels can also be set based on the smallest object desired to be detectable. For example, the smallest object size may be selected based on a distance (how many meters ahead) while the vehicle is traveling at what speed (how many km/h). In this case, the expected size at which the object in a frame projects onto the image can be calculated from an average number of frames required for the three-dimensional location estimation unit 110 to obtain the three-dimensional location. Based on the projected size, the first number of pixels and the second number of pixels may be set as described above.

The expected size of the object to be detected may be dynamically changed based on current traveling location information. In this case, the first number of pixels and the second number of pixels can be dynamically adjusted. The current traveling location information can be acquired by using, for example, a relocalization technique that is acquired by GPS or the like, or by matching image or point cloud information with map information. Here, the map information may be, for example, vehicle-to-everything (V2X), information stored in the storage unit 102, or the like.

Moreover, in the above, for cars, it is described that an object that moves in a horizontal direction is determined as a target, but the present disclosure is not limited thereto. For example, in the case of drones, information in a vertical direction may be particularly required. In such a case, a method of obtaining the first number of pixels and the second number of pixels can be reversed so an object moving in a vertical direction can be more easily detected.

Moreover, the first number of pixels and the second number of pixels may be changed based on other factors besides the image, for example, the driving speed of the car and the state of vehicle steering. Such information may be acquired from image information between frames or may be information acquired by the information processing device 1 through a controller area network (CAN) or the like.

Figure 4:
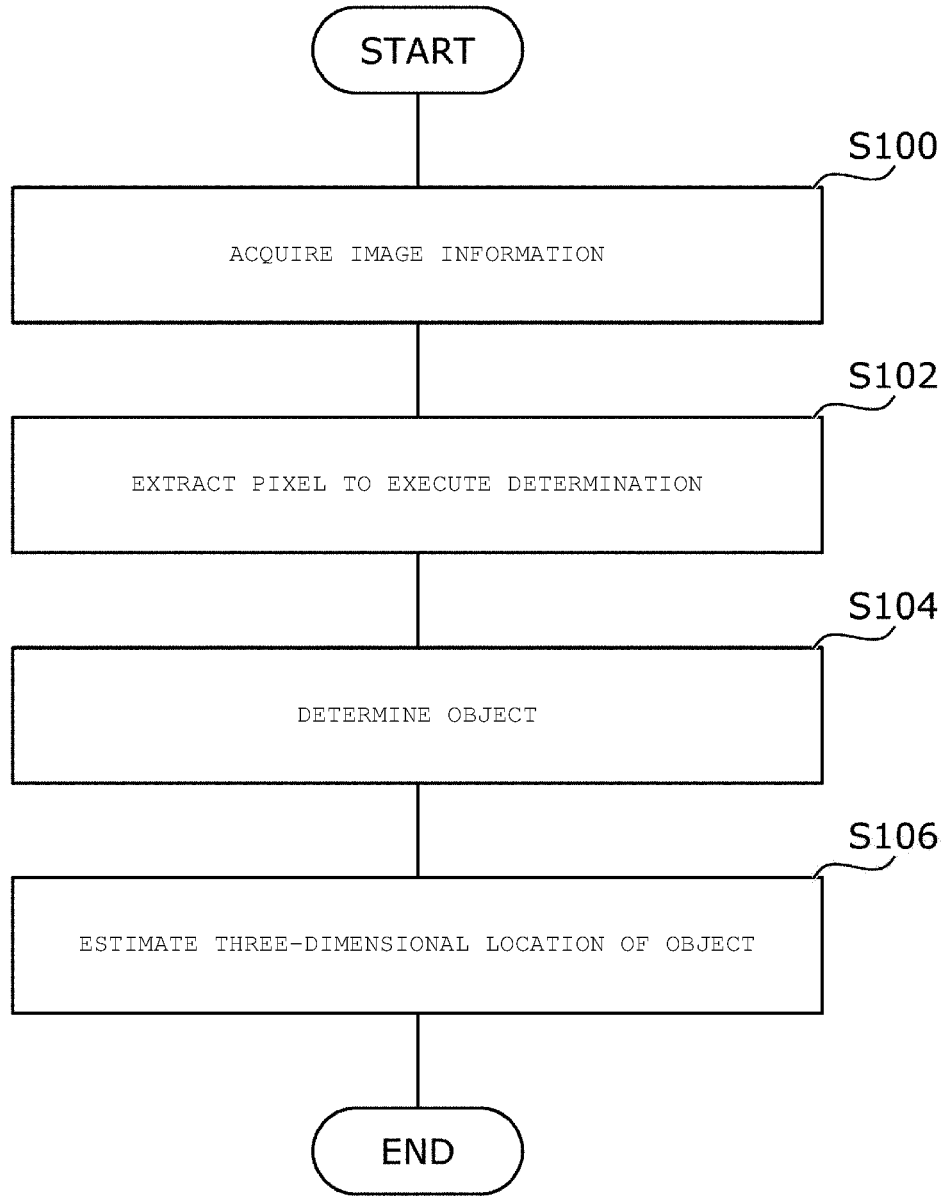
FIG. 4 is a flowchart of information processing device according to an embodiment.
Figure 5:
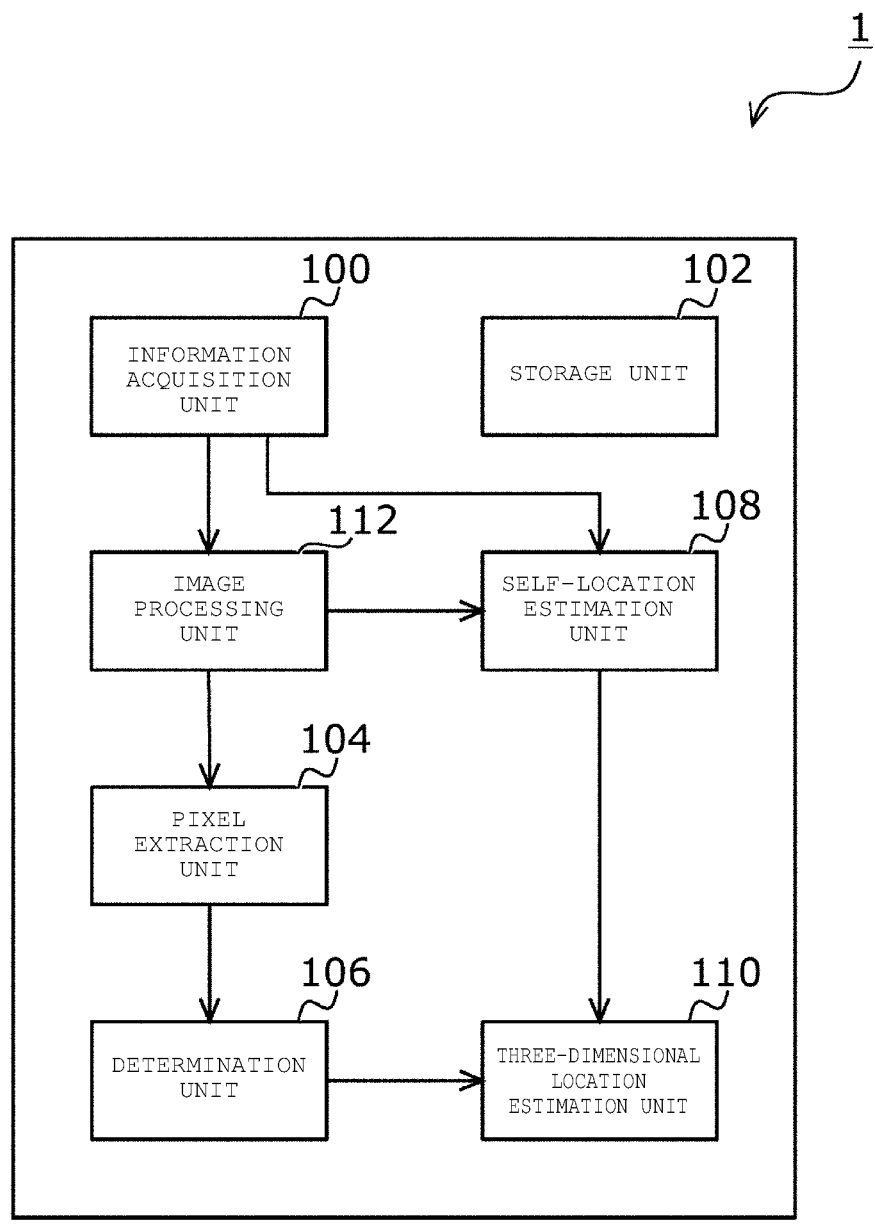
FIG. 5 is a block diagram of an information processing device according to an embodiment.

FIG. 4 is a flowchart showing an operation of the information processing device 1 according to the present embodiment.

The information processing device 1 acquires image information through the information acquisition unit 100 (S100).

Next, the pixel extraction unit 104 selects pixels for executing a determination (detection) of a target from the image information, and then acquires the information of the selected pixels (S102). The selection of pixels is executed by the method(s) described above, for example, as shown in FIGS. 2 and 3.

Next, the determination unit 106 determines whether the target exists in the image based on the information from the pixels extracted by the pixel extraction unit 104 (S104). When the target overlaps with at least one selected pixels in the image, pixel information from pixels surrounding the selected pixels (or a selected pixel) may be extracted. In this way, the determination unit 106 can estimates the region in which the target is located.

Next, the three-dimensional location estimation unit 110 estimates a three-dimensional location of the detected object (target) based on self-location information estimated by the self-location estimation unit 108 and information from the determination unit 106 (S106). The three-dimensional location estimation unit 110 estimates the three-dimensional location from sparse information, which is information of pixels belonging to (overlapping with) the target, as identified by the determination unit 106. Any algorithm may be used for this process.

Further, the estimation of the self-location and posture by the self-location estimation unit 108 may be performed at any time from S100 to S104. This process may be performed in parallel with the processes from S100 to S104. In addition, the same location and posture information may be used over a predetermined time frame.

As described above, according to the present embodiment, the information processing device 1 may implement precise extraction of the target object location within an image while reducing the number of pixels used for detecting the presence of the target in the image, thereby allowing high-accuracy estimation of the three-dimensional location for the target based on the extraction result. By reducing the number of pixels used for detecting the target, a precise distance estimation to the target may be provided while still reducing the required throughput of the processor (processor load). That is, the distance information can be precisely estimated while detecting the target in real time. For example, high-load processing such as necessary for generating an edge image or detecting the points at the edge of an image region or an entire image can be omitted, thereby shortening execution time as well as reducing power consumption.

In another embodiment, the information processing device 1 may be configured without the determination unit 106. In this case, the three-dimensional location estimation unit 110 may estimate (reconstruct) the surrounding three-dimensional information with respect to the camera based on information from the plurality of pixels extracted by the pixel extraction unit 104 and information estimated by the self-location estimation unit 108. Then, based on the reconstructed three-dimensional information, the information processing device 1 may acquire, for example, at least one of surrounding environment information and a self-location correction based on the reconstructed information.

In this way, even when the target is not separately detected by a determination unit 106 or the like, a first number and a second number of pixels may be set in substantially the same manner as described above, thereby increasing a possibility of appropriately acquiring the surrounding environment information, or the like, which is generally difficult to acquire based on the direction of movement when the information is being acquired from a sparse pixel group. As a result, precise three-dimensional reconstruction can be implemented while reducing the number of pixels used for the three-dimensional reconstruction. A general technique may be used for a technique of performing three-dimensional reconstruction from sparse image information.

Second Embodiment

A camera is typically provided with a lens, and an image from the camera may be distorted due to the effect of an optical system such as the lens. In addition, the second direction and the vertical direction may be shifted from each other due to a shift in the direction of the camera sensor. In the second embodiment, an information processing device 1 that reduces the adverse influence of such optical systems will be described.

The information processing device 1 further includes an image processing unit 112 in addition to the elements of the first embodiment described above.

The image processing unit 112 executes a predetermined correction process on image information acquired through the information acquisition unit 100. For example, the correction process is an image tilt correction process such as placing a generally vertically standing object on the ground in the image in parallel to the second direction. For example, the image processing unit 112 executes lens distortion correction to correct a lens aberration affecting the original image as acquired or the like. In addition, for example, image correction may be executed by a method described in Japanese Patent Reference JP-A-2012-68923.

The pixel extraction unit 104 extracts pixel information from the processed image provided by the image processing unit 112. The self-location estimation unit 108 may also estimate the self-location using the processed image from the image processing unit 112.

When the image processing unit 112 is provided therein, an image correction process is executed between the processes of S100 and S102 in FIG. 4.

As described above, according to the second embodiment, the information processing device 1 may also correct the image prior to the extracting of pixel information for detecting a target object. The influence of the characteristics (and/or flaws) of the optical system and from the installation method of a sensor, camera or the like can be reduced by performing an image correction. By making such correction, it is possible to more accurately implement the extraction of the target region and to execute high-precision distance estimation to the target.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An information processing device for vehicle mounted systems for acquiring information about a surrounding environment, the information processing device comprising:
   an image acquisition unit connected to a camera on a vehicle;
   a pixel extraction unit configured to select certain pixels in an array pattern for extraction from a first image from the image acquisition unit, then extracting the selected certain pixels for a plurality of extracted pixels to acquire information from the plurality of extracted pixels in the first image, the first image comprising pixels rows along a first direction and pixel columns along a second direction crossing the first direction, the plurality of extracted pixels being less than all pixels in the first image and including pixels in a first pixel row that are spaced from each other at a shift in the first direction equal to a first number of pixels and pixels in a second pixel row along the first direction that are spaced from each other at a shift in the first direction equal to the first number of pixels but offset from the pixels in the first pixel row by at least one pixel in the first direction, the second pixel row having a shift of a second number of pixels from the first pixel row in the second direction;
   a self-location estimation unit configured to estimate a location and orientation of the camera on the vehicle, the camera having a lens aberration and providing the first image as distorted by the lens aberration;
   a determination unit configured to detect whether a the target object is present in the first image based on the plurality of extracted pixels;
   a three-dimensional location estimation unit configured to reconstruct three-dimensional information related to a surrounding environment of the vehicle based on the information from the plurality of extracted pixels and the location and orientation of the camera as estimated by the self-location estimation unit to estimate a three-dimensional location of the target object in the surrounding environment of the vehicle from the first image; and
   an image processing unit configured to execute image processing to correct the first image with respect to one or more characteristics of the camera, wherein
   the pixel extraction unit acquires the information from the plurality of extracted pixels in the first image based on a corrected image from the image processing unit, and
   the image processing unit corrects the original first image to remove a distortion resulting from the lens aberration affecting the original first image and to place a vertically standing object depicted in the original image to be parallel to the second direction in the corrected first image.

2. The information processing device according to claim 1, wherein the determination unit is further configured to calculate a gradient of the plurality of extracted pixels to determine whether the target object is present in the first image.

3. The information processing device according to claim 1, wherein the determination unit is further configured to calculate a gradient from pixels adjacent to at least one of the plurality of extracted pixels for which the target object is detected to determine whether the target object is present the first image.

4. The information processing device according to claim 1, wherein the pixel extraction unit is configured to adjust at least one of the first number and the second number based on an expected target object size.

5. The information processing device according to claim 4, wherein the pixel extraction unit is further configured to adjust at least one of the first number and the second number based on a rate of change in the location and orientation of the camera as estimated by the self-location estimation unit.

6. The information processing device according to claim 1, wherein the pixel extraction unit is further configured to adjust at least one of the first number and the second number based on a rate of change in the location and orientation of the camera as estimated by the self-location estimation unit.

7. The information processing device according to claim 1, further comprising:
the camera providing the first image.

8. The information processing device according to claim 1, wherein the self-location estimation unit estimates the location and orientation of the camera providing the first image based at least in part using information from a sensor.

9. The information processing device according to claim 1, wherein the pixel extraction unit adjusts the first number and the second number for each image based on a previous image from the camera.

10. The information processing device according to claim 1, wherein the second number of pixels is set to equal a vertical direction dimension of an object in the image measured in pixels divided by one less than the first number of pixels.

11. The information processing device according to claim 1, wherein the three-dimensional location estimation unit estimates the three-dimensional location of the target object in the surrounding environment of the vehicle from the first image without use of a second image from the camera.

12. An information processing method for vehicle mounted systems for acquiring information about a surrounding environment, the method comprising:
acquiring an image from a camera on a vehicle;
selecting certain pixels in an array pattern from the acquired image to provide a plurality of extracted pixels;
acquiring information from the plurality of extracted pixels in the image, the image comprising pixel rows along a first direction and pixel columns along a second direction crossing the first direction, the plurality of extracted pixels being less than all pixels in the image and including pixels in a first pixel row that are spaced from each other at a shift in the first direction equal to a first number of pixels and pixels in a second pixel row along the first direction that are spaced from each other at a shift in the first direction equal to the first number of pixels but offset from the pixels in the first pixel row by at least one pixel in the first direction, the second pixel row having a shift of a second number of pixels from the first pixel row in the second direction;
detecting whether a target object is present in the image based on the plurality of extracted pixels;
estimating a location and orientation of the camera providing the image, the camera having a lens aberration and providing the image as distorted by the lens aberration;
estimating a three-dimensional location of the target object using reconstructed three-dimensional information related to a surrounding environment of the vehicle based on the information from the plurality of extracted pixels, the estimated location and orientation of the camera, and the detection of the target object in the image;

correcting for the lens aberration affecting the original image to provide a corrected image; and
correcting for an image tilt affecting the original image by placing a vertically standing object depicted in the original image to be in parallel to the second direction in the corrected image, wherein
the information from the plurality of extracted pixels is acquired from the corrected image.

13. The information processing method according to claim 12, further comprising:
calculating a gradient from pixels adjacent to at least one of the plurality of extracted pixels for which the target object is detected to determine whether the target object is present the image.

14. The information processing method according to claim 12, further comprising:
adjusting at least one of the first number and the second number based on an expected target object size.

15. The information processing method according to claim 12, further comprising:
adjusting at least one of the first number and the second number based on a rate of change in the estimated location and orientation of the camera.

16. The information processing method according to claim 12, further comprising:
performing an image processing on the image from the camera to correct the image with respect to one or more characteristics of the camera.

17. The information processing method according to claim 12, wherein the three-dimensional location of the target object in the surrounding environment of the vehicle is estimated from the image without use of another image from the camera.

18. An object detector for vehicle mounted systems for acquiring information about a surrounding environment, comprising:
a camera positioned to acquire images of a region along a direction of travel of a vehicle, each image comprising a plurality of pixels in pixel rows along a first direction and pixel columns along a second direction crossing the first direction, the camera having a lens aberration;
a pixel extraction unit configured to select a subset pixels in an array pattern from an image from the camera and extract the selected subset from the image to acquire information from the subset of pixels in the image, the subset of pixels being in a plurality of rows in the first direction, the selected pixels in each row being shifted from an adjacent selected pixel in the subset by a first number of pixels along the first direction, rows in the plurality of rows being shifted from adjacent rows in the plurality of rows by a second number of pixels in the second direction perpendicular to the first direction, the selected pixels of the subset within adjacent rows being offset from each other by at least one pixel along the first direction;
a self-location estimation unit configured to estimate a location and orientation of the camera;
a determination unit configured to detect whether a target object is present in the image based on the subset of pixels;
a three-dimensional location estimation unit configured to reconstruct three-dimensional information related to a surrounding environment of the vehicle based on the information from the subset of pixels extracted by the pixel extraction unit and the location and orientation of the camera as estimated by the self-location estimation unit; and an image processing unit configured to execute image processing on the image to correct the image with respect to one or more characteristics of the camera, wherein the pixel extraction unit acquires the information from the subset of pixels from a corrected image from the image processing unit, and the image processing unit corrects the original image to remove a distortion resulting from the lens aberration affecting the original image and to place a vertically standing object image depicted in the original image to be in parallel to the second direction in the corrected image.

19. The object detector according to claim 18, wherein the pixel extraction unit is configured to adjust at least one of the first number and the second number based on an expected target object size.

20. The object detector according to claim 18, wherein a three-dimensional location of the target object in the surrounding environment of the vehicle is estimated from the image without use of another image from the camera.

* * * * *